United States Patent

Narutaki et al.

[11] Patent Number: 5,315,420
[45] Date of Patent: May 24, 1994

[54] OPTICAL WRITING TYPE LIQUID CRYSTAL DISPLAY DEVICE

[75] Inventors: Yozo Narutaki, Nara; Hisakazu Nakamura, Tenri, both of Japan

[73] Assignee: Sharp Kabushiki Kaisha, Osaka, Japan

[21] Appl. No.: 885,540

[22] Filed: May 19, 1992

[30] Foreign Application Priority Data

May 20, 1991 [JP] Japan .................................. 3-114846

[51] Int. Cl.$^5$ ............................................. G02F 1/133
[52] U.S. Cl. ........................................ 359/53; 359/71; 359/72; 359/73
[58] Field of Search ................... 359/53, 73, 72, 71, 359/93, 94

[56] References Cited

U.S. PATENT DOCUMENTS

| 4,408,839 | 10/1983 | Wiener-Avnear | 359/73 |
| 4,443,065 | 4/1984 | Funada et al. | 359/53 |
| 4,508,427 | 4/1985 | Ross | 359/53 |
| 4,679,910 | 7/1987 | Efron et al. | 359/53 |
| 4,726,660 | 2/1988 | Rushford | 359/73 |
| 5,090,794 | 2/1992 | Hatano et al. | 359/93 |
| 5,136,406 | 8/1992 | Kato et al. | 359/53 |

FOREIGN PATENT DOCUMENTS

| 0284372 | 9/1988 | European Pat. Off. |
| 0478299 | 4/1992 | European Pat. Off. |
| 0036802 | 3/1980 | Japan | 359/53 |
| 0131533 | 5/1989 | Japan | 359/53 |
| 2092769 | 8/1982 | United Kingdom |

OTHER PUBLICATIONS

H. Ikeno, et al., "Compensated Homogeneous Aligned Liquid-Crystal Display For B/W Display", *Proceedings of the SID. Voir Groupe,* vol. 32, No. 4, 1991, pp. 351-354.

*Primary Examiner*—William L. Sikes
*Assistant Examiner*—Huy Mai
*Attorney, Agent, or Firm*—David G. Conlin; George W. Neuner

[57] ABSTRACT

An optical writing type liquid crystal display device is provided with: two twisted nematic liquid crystal cells, each of which has a direction different from each other on twist; a first glass substrate disposed in one liquid crystal cell; and a second glass substrate disposed in another liquid crystal cell. The second glass substrate is laminated to the first glass substrate adjacent to the second glass substrate so as to be at right angles with each other on rubbing directions of the glass substrates. The two twisted nematic liquid crystal cells are arranged such that a polarization axis of a reading light incident onto the two twisted nematic liquid crystal cells is not coincident with the rubbing directions of the two twisted nematic liquid crystal cells.

6 Claims, 5 Drawing Sheets

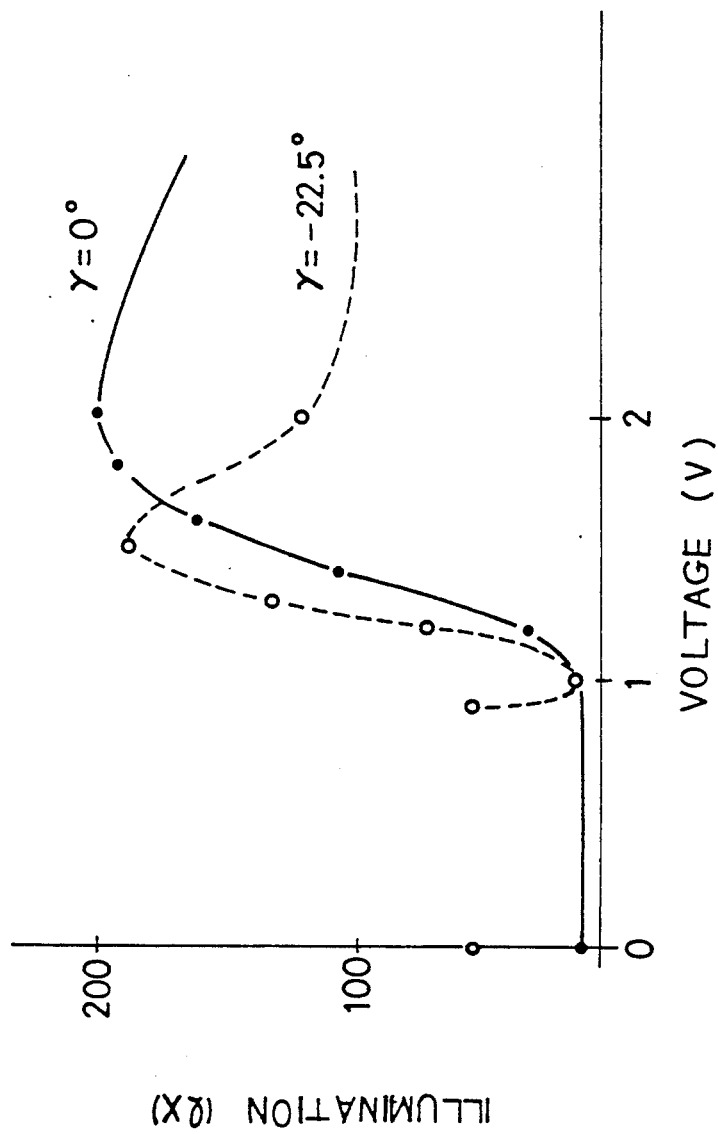

OPTICAL WRITING TYPE LIQUID CRYSTAL DISPLAY DEVICE

FIELD OF THE INVENTION

This invention relates to an optical writing type liquid crystal display device.

DESCRIPTION OF THE PRIOR ART

The liquid crystal display device is used for the display of the portable personal computer or the like owing to its features of small size and low power consumption. The liquid crystal display devices have been headed toward ever-widening popular use in recent years. Simultaneously with this trend, development efforts are being directed to applications other than the conventional use as a mere display. The optical writing type liquid crystal display device (hereafter referred to as the optical writing type LCD) is one of the products resulting from those development efforts.

While the conventional liquid crystal display device is a device for converting an electrical signal into a visual image, the optical writing type LCD is an optical-to-optical conversion device which has a light amplifying function to project as an enlarged illuminated image the image information by laser light or CRT (cathode ray tube) in combination with the projection optical system or a wavelength conversion function to convert red image information into blue image information.

This optical writing type LCD comprises two glass substrates, a photoconductive film consisting of amorphous silicon or the like, a light-shielding layer, a dielectric mirror and a liquid crystal layer, and is structured in a sandwich having the photoconductive film, light-shielding layer, dielectric mirror, and liquid crystal layer placed between two glass substrates.

In the thus constructed optical writing type LCD, in a dark condition that there is no light emitted, the impedance $Z_{PC}$ of the photoconductive film is greater than the impedance $Z_{LC}$ of the liquid crystal, so that a larger voltage is applied to the photoconductive layer than to the liquid crystal layer. If light is emitted from the side of the photoconductive film, the impedance $Z_{PC}$ of the photoconductive film is decreased to a condition of $Z_{PC} < Z_{LC}$, so that a voltage is applied to the liquid crystal layer. At this time, the light emitted from the side of the liquid crystal layer is modulated according to the voltage applied to the liquid crystal layer, that is to say, according to the intensity of the light emitted to the photoconductive film.

With regard to the liquid crystal display mode, as shown in A. Grindberg et al. opt. Eng. vol. 14, pp 217 (1975), the twisted nematic type with a twist angle of 45° has been used which permits luminous display.

In the prior art optical writing type LCD, the ratio of the actually applied voltage to the liquid layer is small between in the light-emitted condition and in the dark condition, so that a sufficient voltage is not applied to the liquid crystal, resulting in a dark display.

SUMMARY OF THE INVENTION

It is therefore an object of the present invention to provide an optical writing type LCD which allows improved luminosity of display.

In an optical writing type liquid display device having compensated liquid crystal cell unit formed by laminating two twisted nematic liquid crystal cells with different directions of twist such that the rubbing directions of the adjacent substrates lie at right angles with each other, a reading light is arranged to be incident on the liquid crystal layers with the polarized light axis thereof not coinciding with the rubbing directions.

In the compensated liquid crystal cell unit made of two twisted nematic liquid crystal cells having different directions of twist, which are laminated such that the rubbing directions of the adjacent substrates lie at right angle with each other, because the reading light is arranged to be incident on the liquid crystal layers in order to prevent the polarized light axis thereof from coinciding with the rubbing directions, according to the result of measurement between the applied voltage and the transmittance of the polarized light by using this device, it has been clarified that it is possible to improve the steepness of change of the transmittance, or in other words, increase the change of the transmittance with respect to the change of applied voltage. Therefore, when the optical writing type liquid crystal display devices are driven with voltage waveform at the fixed voltage ratio, a luminous display can be obtained in the ON state due to the improved steepness of change of the transmittance.

BRIEF DESCRIPTION OF THE DRAWINGS

FIG. 5 is a diagram showing a result of the voltage-transmittance characteristics measured on the screen of the projection type liquid crystal display device including an optical writing type LCD according to the present invention.

DESCRIPTION OF THE PREFERRED EMBODIMENT

An embodiment of the present invention will be described with reference to the accompanying drawings.

Figure 1:
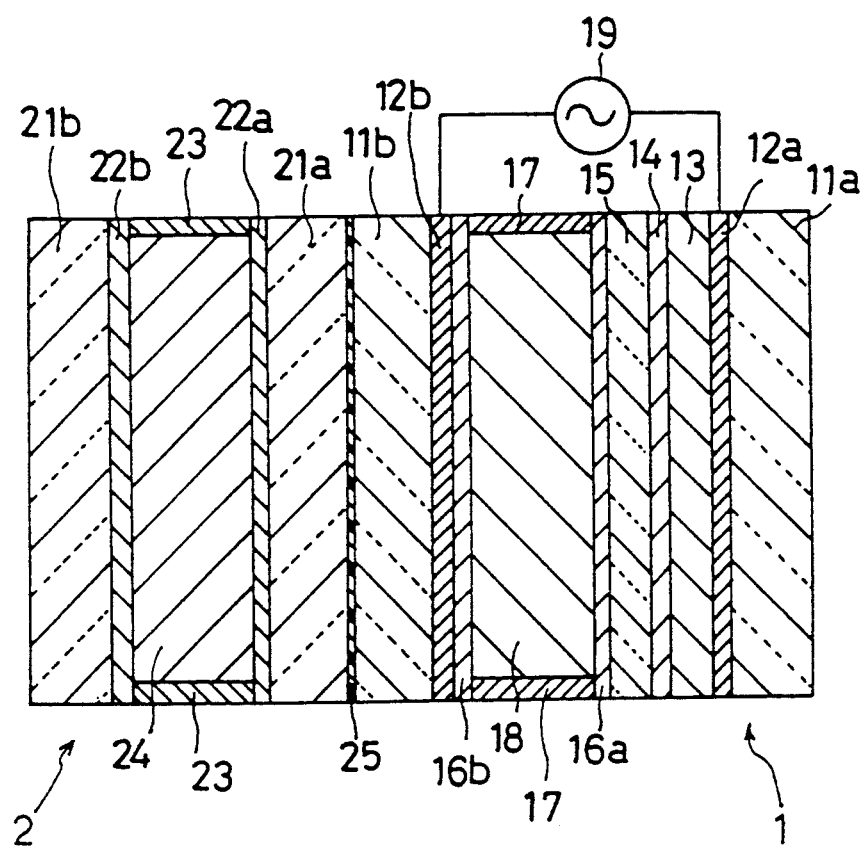
FIG. 1 is a sectional view showing the construction of an embodiment of the liquid crystal cell included in an optical writing type LCD according to the present invention.

FIG. 1 is a sectional view of the construction of an embodiment of the liquid crystal cell used in an optical writing type LCD according to the present invention.

The optical writing type LCD according to this embodiment constitutes a so-called compensated type reflective projection liquid crystal display device formed by laminating two twisted nematic liquid crystal cells.

As shown in FIG. 1, the optical writing type LCD according to this embodiment is made by depositing two liquid crystal cells, namely, a first liquid crystal cell to which a voltage is applied and a second liquid crystal cell for compensation, which will be described later.

The first liquid crystal cell 1 comprises transparent glass substrates 11a and 11b, transparent electrodes 12a and 2b, an a-Si (amorphous silicon) layer 13, a light-shielding layer 14, a dielectric mirror 15, oriented films 16a and 16b, and sealing members 17, and this first liquid crystal cell 1 is formed as described below.

On the glass substrate 11a, a transparent electrode 12a is formed by depositing an ITO (indium tin oxide) film by the spattering process. Then, on the transparent electrode 12a, a photoconductive a-Si film 13 is formed by the plasma CVD (chemical vapor deposition). Next, an acrylic resin in which carbon black has been dispersed is applied to the a-Si layer 13, and by baking the acrylic resin, a light-shielding layer 13 is formed. Subsequently, the dielectric mirror 15 is formed by alternately depositing $SiO_2$ and $TiO_2$ by the EB evaporation process.

An oriented film 16a is formed by applying a polyimide layer by the spin coating process to the substrate formed as described and baking the polyimide layer, and another oriented film 16b is formed by applying a polyimide layer to the transparent electrode 12b which is an ITO film deposited on the other glass substrate 11b by the sputtering process and baking the polyimide layer. The oriented films 16a and 16b of the thus prepared two substrates are then subjected to an orientation process which rubs the surfaces of those films, and the two substrates are put together with the insertion of sealing members 17 including a spacer.

In this way, the first liquid crystal cell has been formed.

The space formed by the oriented films 16a and 16b and the sealing material 17 is filled with a liquid crystal material and sealed to form a liquid crystal layer 18.

The light-shielding layer 14 is provided to prevent the photoconductive a-Si layer 13 from being exposed to a strong light (reading light) from the side of the liquid crystal layer 18.

An a.c. power supply 19 is connected to the transparent electrodes 12a and 12b, to apply voltage to the first liquid crystal cell 1.

The second liquid crystal 2 comprises transparent glass substrates 21a and 21b, oriented films 22a and 22b, and sealing members 23, and is formed as described below.

In the same manner as in the formation of the first liquid crystal cell, oriented films 22a and 22b are formed by applying a polyimide layer to the glass substrates 21a and 21b and baking the polyimide layer. Next, an orientation process by rubbing is performed on the surfaces of the oriented films 22a and 22b of the substrates, and then, those substrates are put together with the insertion of sealing members 23 including a spacer. The rubbing direction for the second liquid crystal cell lies at right angles to the rubbing direction of the first liquid crystal cell.

The orientation processes in the formation of the first and second liquid crystals are performed such that the twist directions of the first and second liquid crystal cells 1 and 2 are opposite.

The space formed by the oriented films 22a and 22b and the sealing material 23 is filled with a liquid crystal material to form a liquid crystal layer 24.

As a liquid crystal material to be filled in the liquid crystal layers 18 and 24, SD-4107 (made by Chisso, $\Delta n=0.135$) or ZLI-1646 (made by Merk, $\Delta n=0.08$), for example, may be used. Here, $\Delta n$ denotes double refraction index.

Figure 2A:
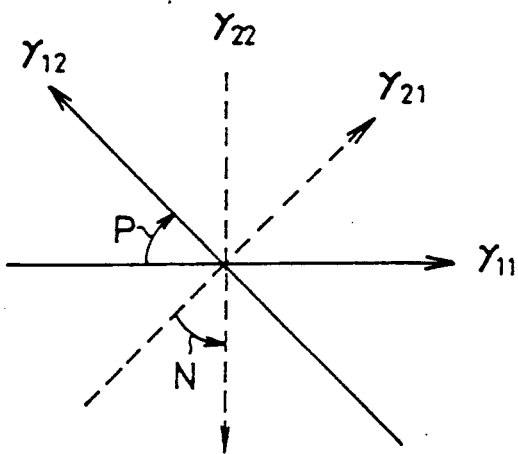
FIGS. 2a and 2b are explanatory diagrams showing the relation between the liquid crystal molecular axis and the incident polarization axis of first and second liquid crystal cells.
Figure 2B:
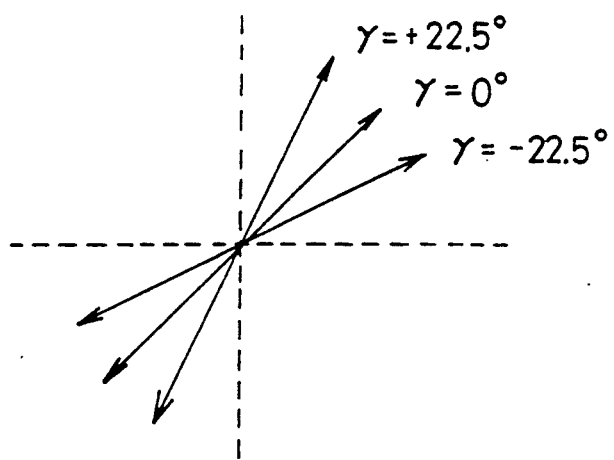

FIGS. 2a and 2b are explanatory diagrams showing the relation between the liquid crystal molecular axis and the incident polarized light axis in the first and second liquid crystal cells. FIG. 2a shows the rubbing directions of the substrates of the first and second liquid crystal cells. FIG. 2b shows the positional relation between the incident polarized light axis and the liquid crystal molecular axis.

The first and second liquid crystal cells are fixed by gluing with an adhesive transparent resin 25 having the same refraction index as that of glass such that the directions of the liquid crystal molecules on the glass substrates located on the side, where the first and second liquid crystals contact, lie at right angle with each other.

For the resin 25, a resin 801 se-f (made by Kyohritsu Kagaku), for example, may be used.

Therefore, as shown in FIG. 2a, the rubbing directions $\gamma_{11}$ and $\gamma_{22}$ of the lower (oriented film 16b side) substrate of the first liquid crystal cell and the upper (oriented film 22a side) substrate of the second liquid crystal cell lie at right angle with each other.

As indicated by the arrows P and N in FIG. 2a, the directions of twist of the first and second liquid crystal cells are opposite.

Therefore, the liquid crystal cells provided in the optical writing type LCD according to this embodiment have opposite twist directions, and the liquid crystal cells each having a twist angle of 45° are laminated to form this LCD.

Table 1 shows the voltage-transmittance characteristics of the liquid crystal cells included in the optical writing type LCD according to the present invention in comparison with those of the prior-art one-layer liquid crystal cell.

TABLE 1

| | Two-layer cell | | | | One-layer cell | |
|---|---|---|---|---|---|---|
| $\Delta nd$ | $\alpha$ | $\gamma(°)$ | $\alpha$ | $\gamma(°)$ | $\alpha$ | Liquid crystal |
| 0.45 | 1.26 | −22.5 | 1.38 | 0 | 1.42 | ZLI-1646 |
| 0.50 | 1.26 | −22.5 | 1.35 | 0 | 1.37 | ZLI-1646 |
| 0.68 | 1.18 | +22.5 | 1.28 | 0 | 1.27 | SD-4107 |
| 0.75 | 1.15 | +22.5 | 1.27 | 0 | 1.26 | SD-4107 |
| 0.80 | 1.16 | +22.5 | 1.38 | 0 | 1.27 | SD-4107 |

In Table 1, $\Delta_n$ denotes the double refraction index, and d denotes the thickness of the liquid crystal layer. And, $\alpha$ is a parameter representing the steepness of change, or the rate of voltages of each liquid crystal layer between the transmittance of 10% and 90%, and $\gamma$ is the angle formed by the liquid crystal molecular axis and the incident polarized light axis, and $\gamma=0°$ when the rubbing direction $\gamma_{21}$ of the oriented film 22b and the incident polarized light axis coincide with each other.

The $\alpha$ when $\gamma \approx 0°$ in the two-layer cell shows values corresponding to cases where the steepness of characteristics is more precipitous, that is, the change of the transmittance with respect to the change of applied voltage is greater between the angle $\gamma=+22.5°$ and $-22.5°$.

Though the angle $\gamma$ is represented by $+22.5°$ or $-22.5°$, the characteristics of the two-layer cell is more precipitous than those of the one-layer liquid crystal cell with a twist angle of 45° in the range of $\gamma \pm 10°$. More specifically, it is desirable to have $22.5°\pm 10°$ as the angle formed by the incident polarized light axis and the liquid crystal molecular axis. The values of α when γ=0° are also shown for comparison.

Figure 3:
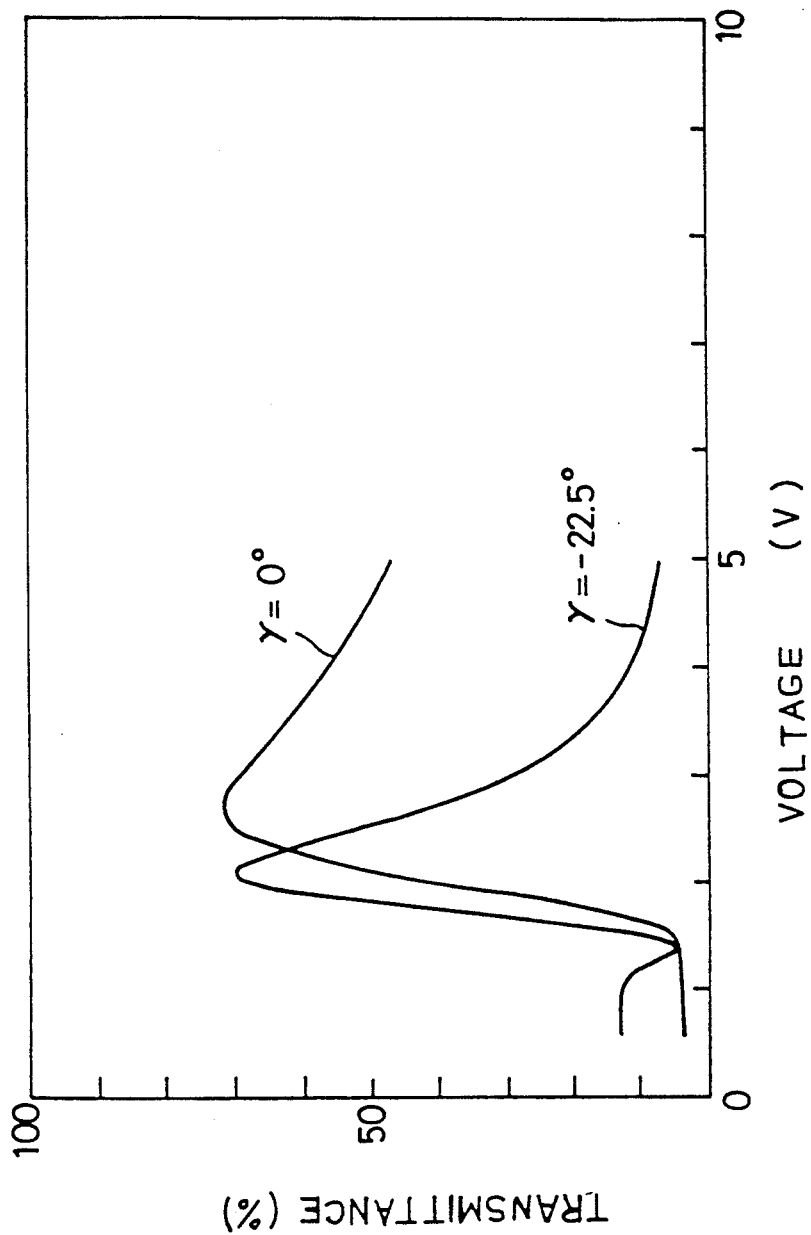
FIG. 3 is a diagram showing an example of comparison of the voltage-transmittance characteristics between the above-mentioned embodiment of the liquid crystal cell included in the optical writing type LCD according to the present invention and the liquid crystal cell of the prior art.

FIG. 3 is a diagram showing an example in which the voltage-transmittance characteristics are compared between an embodiment of the liquid crystal cell included in the optical writing type LCD according to the present invention and the prior art.

As shown in FIG. 3, the one-layer liquid crystal cell with a twist angle of 45° which has been conventionally used in the optical writing type LCD had a small change of transmittance with respect to change of applied voltage. For example, as presented in the column for the "one-layer cell", the value of α of the liquid crystal cell ZLI-1646 (made by Merk) having a twist angle of 45° is 1.42 when Δnd=0.45.

On the other hand, the impedance of each layer of the optical writing type LCD according to this embodiment is $3.3 \times 10^7$ ohm ($Z_{PC,d}$) when the photoconductive layer is in the dark state, and $2.1 \times 10^6$ ohm ($Z_{PC,p}$) when the photoconductive layer is in the luminous state. A combined impedance of the dielectric mirror and the light-shielding layer is $2.0 \times 10^7$ ohm ($Z_M$), and the impedance of the liquid crystal layer is $7.2 \times 10^7$ ohm ($Z_{LC}$). Therefore, the rate of impedance between the dark and luminous states is given by the following division.

$$\{Z_{LC}/(Z_{PC,p}+Z_M+Z_{LC})\}/\{Z_{LC}/(Z_{PC,d}+Z_M+Z_{LC})\}=1.3$$

Supposing the voltage applied to the liquid crystal layer in the dark state that a writing light is not emitted is 1, in the luminous state that a writing light is emitted, a voltage as small as 1.3 times that in the dark state is applied to the liquid crystal layer. For this reason, with the liquid crystal cell with α value of 1.42, the transmittance in the luminous state was low, and the display was dark. The contrast is 5 in the one-layer liquid crystal cell of the prior art. If comparison is made when Δnd=0.45, as shown in Table 1, according to this embodiment, the steepness of characteristics is improved from 1.42 to 1.26 in terms of the value of α, the contrast of 10 can be obtained.

Description will now be made of the result of projection by the optical writing type LCD including liquid crystal cells formed as described above. This projection is performed using an optical system, which makes it possible to evaluate the characteristics of the liquid crystal cells.

Figure 4:
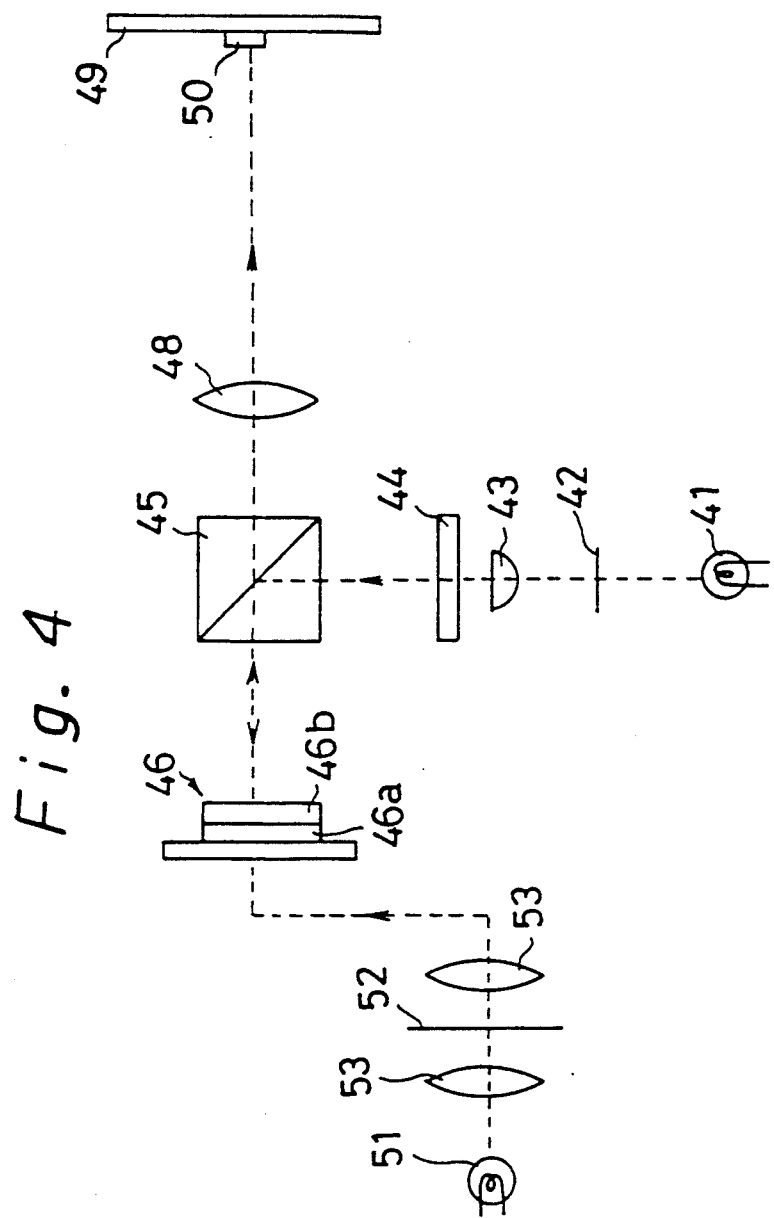
FIG. 4 is a schematic diagram showing the construction of an embodiment of a projection type liquid crystal display device including the optical writing type LCD according to the present invention.

FIG. 4 shows a schematic diagram showing the construction of an embodiment of a projection type liquid crystal display device including an optical writing type LCD according to the present invention.

As shown in FIG. 4, in the projection type liquid crystal display device including an optical writing type LCD according to this embodiment, there are provided an optical writing type LCD 46 and an optical system, including a light source 41, a diaphragm 42, a lens 43, an interference filter 44, a polarized beam splitter 45, a projection lens 48, a screen 49, an illumination meter 50, a writing light source 51, a writing pattern 52, and lenses 53.

The optical writing type LCD 46 is located in an optical path between the polarized beam splitter 45 and the lenses 53, and includes a first liquid crystal cell 46a to which a voltage is applied and a second liquid crystal cell 46b for compensation. The first liquid crystal cell 46a and the second liquid crystal cell 46b respectively correspond to the first and second liquid cells described with reference to FIG. 1.

In the arrangement as described, a light from the writing light source 51 is emitted through the lenses to the writing pattern 52, and a picture of the writing pattern 52 is written in the optical writing type LCD 46. The light from the light source 41 passes through the diaphragm 42, the lens 43, and the interference filter 44, and is reflected by the polarized beam splitter 45, and only an S wave is incident on the optical writing type LCD in which the picture of the writing pattern 52 has been written as described. The orientation change of that part of the liquid crystal layer of the optical writing type LCD 46 which corresponds to the written picture causes the polarized state of the incident light to be modulated, only a P wave out of the modulated light passes through the polarized beam splitter 45, and is projected by the projection lens 48 on the screen 49.

In this experiment, ZLI-1646 (made by Merk) was used for the liquid crystal, the value of Δnd of the first liquid crystal cell to which a voltage was applied was 0.41, and the value of Δnd of the second liquid crystal cell was 0.37. The ON voltage and the OFF voltage applied to the first liquid crystal cell were 1.24 (V) and 0.95 (V), respectively.

FIG. 5 is a diagram showing the result of the voltage-transmittance characteristics measured on the screen 49 of the projection type liquid crystal display device including an optical writing type LCD according to the present invention.

Table 2 shows measurement results by the illumination meter of the illumination (lux 1x) on the screen 49 measured while the voltage applied to the first liquid crystal cell is varied.

TABLE 2

| γ | Illumination (1 ×) OFF | ON | CR |
|---|---|---|---|
| 0° | 4.0 | 64 | 16 |
| −22.5° | 3.6 | 124 | 34 |

As shown in Table 2, while the contrast (CR) was 16 when γ=0°, the contrast when γ=−22.5° was 34, which is more than twice as high as the contrast when γ=0°. In a preferred embodiment, the value of Δnd should desirably be from 0.45 to 0.75.

According to this embodiment, the polarized axis of the light incident on the liquid crystal layers of the optical writing type LCD is prevented from coinciding with the rubbing directions. Therefore, from the above-mentioned result of measurement of the relation between the applied voltage and the transmittance of the incident polarized light, it is understood that it is possible to improve the steepness of the voltage-transmittance characteristics, that is, enlarge the change of transmittance with respect to the change of applied voltage. Therefore, when the optical writing type LCD is driven at a fixed voltage rate, the improved steepness of the characteristics permits a luminous display to obtained in the ON state.

As has been described, the present invention provides an optical writing type liquid display device having a compensated liquid crystal cell formed by laminating two twisted nematic liquid crystal cells with different directions of twist such that the rubbing directions of the adjacent substrates lie at right angles with each other, a reading light is arranged to be incident on the liquid crystal cells with the polarized light axis thereof not coincident with the rubbing directions.

What is claimed is:

1. An optical writing type liquid-crystal display device, comprising:
   two twisted nematic liquid crystal cells, each of which has a twist direction different from the other, each cell being formed by two glass substrates;
   a first twisted nematic liquid crystal cell formed by a first glass substrate and a second glass substrate, the first and second glass substrates having a first twisted nematic liquid crystal composition disposed therebetween;
   a second twisted nematic liquid crystal cell formed by a third glass substrate and a fourth glass substrate, the third and fourth glass substrates having a second twisted nematic liquid crystal composition disposed therebetween;
   a first cell being laminated to the second cell by laminating the second glass substrate to the third glass substrate;
   a photoconductive layer disposed on the first glass substrate between the substrate and the liquid crystal composition for changing an impedance according to light applied on said photoconductive layer;
   a first transparent electrode disposed on said second substrate on the side of said second substrate nearest said first substrate,
   a second transparent electrode disposed on the first substrate on the same side of said first glass substrate as said photoconductive layer;
   said two twisted nematic liquid crystal cells being arranged such that a polarized axis of a light incident onto the two twisted nematic liquid crystal cells is not coincident with molecular axes of liquid crystal composition of the second twisted nematic liquid crystal cell in order to increase a change of a transmittance of the incident light onto the two twisted nematic liquid crystal cells in response to a change of a voltage applied to the first twisted nematic liquid crystal cell.

2. An optical writing type liquid crystal display device according to claim 1, wherein the third glass substrate of said second cell is laminated to the second glass substrate of said first cell by a resin layer.

3. An optical writing type liquid crystal display device according to claim 2, wherein a dielectric mirror layer is formed on the first glass substrate on the side adjacent to the liquid crystal composition.

4. An optical writing type liquid crystal display device according to claim 3, wherein a light-shielding layer is disposed on the first substrate adjacent to the dielectric mirror layer.

5. An optical writing type crystal display device according to claim 1, an angle made by a polarized axis of a light incident onto the two twisted nematic liquid crystal cells and by the molecular axes of liquid crystal composition of the second twisted nematic liquid crystal cell is in the range of $22.5° \pm 10°$.

6. An optical writing type crystal display device according to claim 1, wherein the liquid crystal composition in the each twisted nematic crystal cell is sealed by oriented film layers disposed on the first and second substrates or third and fourth substrates, respectively, and by sealing members.

* * * * *